United States Patent
Shin et al.

(10) Patent No.: US 12,511,496 B2
(45) Date of Patent: Dec. 30, 2025

(54) METHOD AND APPARATUS FOR DETECTING SAFETY INFORMATION VIA ARTIFICIAL INTELLIGENCE FROM ELECTRONIC DOCUMENT

(71) Applicant: SELTA SQUARE CO., LTD., Seoul (KR)

(72) Inventors: Min Kyung Shin, Hwaseong-si (KR); Sol Ji Yang, Seoul (KR); Min Su Lee, Seoul (KR)

(73) Assignee: SELTA SQUARE CO., LTD., Seoul (KR)

( * ) Notice: Subject to any disclaimer, the term of this patent is extended or adjusted under 35 U.S.C. 154(b) by 270 days.

(21) Appl. No.: 18/361,925

(22) Filed: Jul. 31, 2023

(65) Prior Publication Data

US 2024/0054296 A1 Feb. 15, 2024

(30) Foreign Application Priority Data

Aug. 9, 2022 (KR) .................. 10-2022-0099171

(51) Int. Cl.
*G06F 40/40* (2020.01)
*G06F 40/103* (2020.01)
(Continued)

(52) U.S. Cl.
CPC ............ *G06F 40/40* (2020.01); *G06F 40/103* (2020.01); *G06F 40/279* (2020.01);
(Continued)

(58) Field of Classification Search
CPC ...... G06F 40/40; G06F 40/103; G06F 40/279; G06F 40/284; G06F 40/30; G16H 15/00; G16H 70/40; G16H 20/10; G06V 30/413
See application file for complete search history.

(56) References Cited

U.S. PATENT DOCUMENTS 10,540,438 B2 * 1/2020 Nagarajan .............. G06N 20/00
10,614,196 B2 * 4/2020 Maitra ................... G16H 50/20
(Continued)

OTHER PUBLICATIONS

Shi, Yiwen, Jing Wang, Ping Ren, Taha ValizadehAslani, Yi Zhang, Meng Hu, and Hualou Liang, "Fine-Tuning BERT for Automatic ADME Semantic Labeling in FDA Drug Labeling to Enhance Product-Specific Guidance Assessment", Jul. 2022, arXiv preprint arXiv:2207.12376, pp. 1-21. (Year: 2022).*
(Continued)

*Primary Examiner* — Daniel C Washburn
*Assistant Examiner* — James Boggs

(57) ABSTRACT

A method of detecting safety information in an electronic document includes obtaining text data in the electronic document, performing preprocessing for transforming an abbreviation existing in the obtained text data in the electronic document into a full term, indexing or classifying text existing in the preprocessed electronic document, determining whether the electronic document is an individual case safety report (ICSR) using drug information and adverse event information, and outputting at least one report including at least one of a first result of determining a reference, a second result of indexing or classifying text or a third result of determining whether it is an ICSR. The at least one report includes at least one individual report including one of the first result, the second result or the third result, or at least one of integrated reports including a result of integrating a plurality of results among the first result, the second result and the third result.

18 Claims, 10 Drawing Sheets

(51) Int. Cl.
  G06F 40/279    (2020.01)
  G06F 40/284    (2020.01)
  G06F 40/30     (2020.01)
  G06V 30/413    (2022.01)
  G16H 15/00     (2018.01)
  G16H 20/10     (2018.01)
  G16H 70/40     (2018.01)

(52) U.S. Cl.
  CPC ........... *G06F 40/284* (2020.01); *G06F 40/30* (2020.01); *G06V 30/413* (2022.01); *G16H 15/00* (2018.01); *G16H 20/10* (2018.01); *G16H 70/40* (2018.01)

(56) References Cited

U.S. PATENT DOCUMENTS

| | | | | |
|---|---|---|---|---|
| 10,811,125 | B2* | 10/2020 | Bao .................. | G16H 10/60 |
| 10,957,432 | B2* | 3/2021 | Bao .................. | G16H 70/40 |
| 11,183,306 | B2* | 11/2021 | Viswanathan ......... | G16H 40/20 |
| 11,847,415 | B2* | 12/2023 | Kiazand ............... | G16H 70/40 |
| 12,288,039 | B1* | 4/2025 | Smathers .............. | G06F 40/44 |
| 2020/0294681 | A1* | 9/2020 | Routray ............... | G06N 5/022 |
| 2021/0249139 | A1* | 8/2021 | Thakore .............. | G06V 30/424 |
| 2022/0100958 | A1 | 3/2022 | Kiazand et al. | |
| 2022/0179906 | A1* | 6/2022 | Desai ................. | G06F 16/93 |
| 2022/0336111 | A1* | 10/2022 | Ohana ................. | G06N 3/09 |
| 2023/0335232 | A1* | 10/2023 | Jin .................. | G16H 10/20 |

OTHER PUBLICATIONS

Martenot, Vincent, Valentin Masdeu, Jean Cupe, Faustine Gehin, Margot Blanchon, Julien Dauriat, Alexander Horst, Michael Renaudin, Philippe Girard, Jean-Daniel Zucker, "LiSA: An assisted literature search pipeline for detecting serious adverse drug events with deep learning", Mar. 2022, hal-03625190. (Year: 2022).*

Hussain, Sajid, Hammad Afzal, Ramsha Saeed, Naima Iltaf, and Mir Yasir Umair, "Pharmacovigilance with Transformers: A Framework to Detect Adverse Drug Reactions Using BERT Fine-Tuned with FARM", Aug. 2021, Computational and Mathematical Methods in Medicine, vol. 2021, No. 1, pp. 1-12. (Year: 2021).*

White, Ryen W., Nicholas P. Tatonetti, Nigam H. Shah, Russ B. Altman, and Eric Horvitz, "Web-Scale Pharmacovigilance: Listening to Signals from the Crowd", Mar. 2013, Journal of the American Medical Informatics Association, vol. 20, No. 3, pp. 404-408. (Year: 2013).*

Henriksson, Aron, Hans Moen, Maria Skeppstedt, Vidas Daudaravičius, and Martin Duneld, "Synonym extraction and abbreviation expansion with ensembles of semantic spaces", Feb. 2014, Journal of Biomedical Semantics, vol. 5, Article No. 6, pp. 1-25. (Year: 2014).*

Shaun Comfort, et al., "Sorting Through the Safety Data Haystack: Using Machine Learning to Identify Individual Case Safety Reports in Social-Digital Media", Drug Safety (2018) 41:579-590.

Harsha Gurulingappa, et al., "Development of a benchmark corpus to support the automatic extraction of drug-related adverse effects from medical case reports," Journal of Biomedical Informatics 45 (2012) 885-892.

Vanja Wallner, "Mapping medical expressions to MedDRA using Natural Language Processing," Department of Information Technology, Uppsala Universitet, Nov. 2020.

"Enhancing Pharmacovigilance with Drug Reviews and Social Media," Brent Biseda, et al., arXiv:2004.08731, Apr. 18, 2020.

"Pharmacovigilance with Transformers: A Framework to Detect Adverse Drug Reactions Using BERT Fine-Tuned with FARM," Sajid Hussain, et al., Computational and Mathematical Methods in Medicine, vol. 2021, Article ID 5589829, Aug. 13, 2021.

"Text Mining of Adverse Events in Clinical Trials: Deep Learning Approach," Daphne Chopard, et al., JMIR Medical Informatics 2021, vol. 9 Issue 12, Dec. 24, 2021.

"Neural Natural Language Processing for Unstructured Data in Electronic Health Records: a Review," Irene Li, et al., arXiv:2107.02975v1, Jul. 7, 2021.

"Text mining of accident reports using semi-supervised keyword extraction and topic modeling," Abdhul Ahadh, et al., Process Safety and Environmental Protection, vol. 155, Nov. 2021, pp. 455-465.

"A pre-trained BERT for Korean medical natural language processing," Yoojoong Kim, et al., Scientific Reports (2022) 12:13847.

* cited by examiner

METHOD AND APPARATUS FOR DETECTING SAFETY INFORMATION VIA ARTIFICIAL INTELLIGENCE FROM ELECTRONIC DOCUMENT

CROSS REFERENCE TO RELATED APPLICATION

The present application claims priority to Korean Patent Application No. 10-2022-0099171 filed on Aug. 9, 2022, the entire contents of which is incorporated herein for all purposes by this reference.

BACKGROUND

Field of the Disclosure

The present disclosure relates to a method and apparatus for detecting safety information existing in an electronic document.

Description of the Related Art

Since the teratogenic side effects of thalidomide were reported in the 1960s, the importance of pharmacovigilance has emerged worldwide, which has served as an opportunity to establish an international drug safety management system. Pharmacovigilance is a scientific activity for detection, evaluation, interpretation, and prevention of adverse events or safety-related problems of drugs, in order to promote the safety and welfare of patients. Drug safety information may be collected from voluntarily reported data and information collected through a planned system such as tests and studies. Since the World Wide Web (WWW) became common to the public in the 1990s and electronic libraries began to emerge, the World Health Organization (WHO), the International Conference on Harmonization of Technical Requirements of Pharmaceuticals for Human Use (ICH), and worldwide regulatory authority cooperating with them has extend the range of safety information gathering sources to the Internet and digital media. However, since information accumulated through the Internet and digital media is accumulated without restrictions on time and space, the amount is vast and, since anyone may become an information producer, the quality may not be guaranteed. Due to these characteristics, a lot of human resources are inefficiently consumed to detect meaningful safety information. This puts a greater burden on the industry in a situation where it is already burdened by dealing with the explosive increase in reports of adverse drug reactions due to the recent globalization of drug use, strengthened pharmacovigilance regulations, and periodic pandemics. In a situation where the need for a new methodology and system is emerging in the industry, the continuously developing big data deep learning algorithm and artificial intelligence (AI) technology are attracting attention as a way out, and many studies related to pharmacovigilance are being conducted.

SUMMARY

An object of the present disclosure is to provide a method and apparatus for effectively detecting safety information existing in an electronic document.

An object of the present disclosure is to provide a method and apparatus for checking safety information existing in an electronic document.

An object of the present disclosure is to provide a method and apparatus for managing adverse drug reaction (ADR) existing in an electronic document.

An object of the present disclosure is to provide a method and apparatus for more systematic medical evaluation using safety information in an electronic document.

The technical problems solved by the present disclosure are not limited to the above technical problems and other technical problems which are not described herein will become apparent to those skilled in the art from the following description.

A method of detecting safety information in an electronic document according to an embodiment of the present disclosure may include obtaining text data in the electronic document, performing preprocessing for transforming an abbreviation existing in the obtained text data in the electronic document into a full term, indexing or classifying text existing in the preprocessed electronic document, determining whether the electronic document is an individual case safety report (ICSR) using drug information and adverse event information, and outputting at least one report including at least one of a first result of determining a reference, a second result of indexing or classifying text or a third result of determining whether it is an ICSR. The at least one report may include at least one individual report including one of the first result, the second result or the third result, or at least one of integrated reports including a result of integrating a plurality of results among the first result, the second result and the third result.

According to an embodiment of the present disclosure, the performing preprocessing may include transforming the electronic document into text data.

According to an embodiment of the present disclosure, the determining the reference may include detecting whether the reference exists in text which is not transformed into the full term in the performing preprocessing and checking whether another literature which has been previously reviewed exists in the detected reference.

According to an embodiment of the present disclosure, the indexing or classifying the text may include indexing pharmaceutical information with respect to text subjected to abbreviation transform.

According to an embodiment of the present disclosure, the indexing or classifying the text may include classifying text by inputting text which has not been subjected to abbreviation transform to a classification model.

According to an embodiment of the present disclosure, the classification model may classify input text by classification label.

According to an embodiment of the present disclosure, the classification model may be a Bidirectional Encoder Representations from Transformers (BERT) fine-tuned using classification model learning data.

According to an embodiment of the present disclosure, the determining whether it is an ICSR may include performing reading comprehension and determination by inferring correct answer text using a result of indexing or classifying the text, evaluating predictability by checking whether adverse event information of a drug exists in drug approval information and determining an individual adverse event by determining whether the electronic document corresponds to an ICSR.

According to an embodiment of the present disclosure, the performing reading comprehension and determination may include inferring correct answer text by inputting at least one of question data generated using data extracted in indexing of pharmaceutical information or sentences generated in classifying by classification label.

According to an embodiment of the present disclosure, the machine reading comprehension model may be a Bidirectional Encoder Representations from Transformers (BERT) fine-tuned using reading comprehension model learning data.

According to an embodiment of the present disclosure, the reading comprehension learning data may include at least one of a paragraph, a question or an answer.

According to an embodiment of the present disclosure, the evaluating the predictability may include obtaining adverse drug reaction information in the performing reading comprehension and determination, searching for the adverse event information in drug approval information and checking whether the adverse event exists in the drug approval information. In the checking whether the adverse event exists in the drug approval information, it may be determined to be a predictable side effect when the adverse reaction exists in the drug approval information and it may be determined to be an unpredictable side effect when the adverse reaction does not exist in the drug approval information.

According to an embodiment of the present disclosure, the determining the individual adverse event may include inputting a result obtained in the evaluating the predictability to an ICSR determination system and determining whether the obtained result corresponds to an ICSR.

According to an embodiment of the present disclosure, the method may further include highlighting original text.

According to an embodiment of the present disclosure, the highlighting the original text may include finding and highlighting sentences classified by classification label in the classifying by classification label.

According to an embodiment of the present disclosure, the highlighting the original text may include finding and highlighting terms indexed in the indexing the pharmaceutical information in the electronic document.

According to an embodiment of the present disclosure, the highlighting the original text may include highlighting the original text with different colors by classification of the label detected in the classifying by classification label.

According to an embodiment of the present disclosure, an apparatus for detecting safety information in an electronic document may include a storage unit configured to store information necessary for operation of the apparatus and a processor connected to the storage unit. The processor may obtain text data in the electronic document, perform preprocessing for transforming an abbreviation existing in the obtained text data in the electronic document into a full term, index or classify text existing in the preprocessed electronic document, determine whether the electronic document is an individual case safety report (ICSR) using drug information and adverse event information, and output at least one report including at least one of a first result of determining a reference, a second result of indexing or classifying text or a third result of determining whether it is an ICSR. The at least one report may include at least one individual report including one of the first result, the second result or the third result, or at least one of integrated reports including a result of integrating a plurality of results among the first result, the second result and the third result.

According to an embodiment of the present disclosure, the processor may highlight a result output in a process of indexing or classifying the text.

The features briefly summarized above with respect to the present disclosure are only exemplary aspects of the detailed description of the present disclosure that follows, and do not limit the scope of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE PREFERRED EMBODIMENTS

Figure 1:
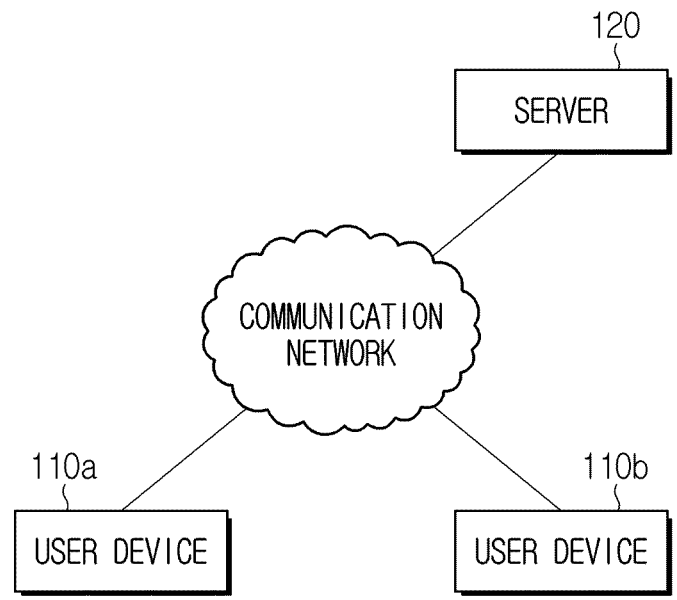
FIG. 1 illustrates a structure of a system that provides a safety information detection method according to an embodiment of the present disclosure.

Hereinafter, with reference to the accompanying drawings, embodiments of the present disclosure will be described in detail so that those skilled in the art can easily carry out the present disclosure. However, the present disclosure may be embodied in many different forms and is not limited to the embodiments described herein.

In describing the embodiments of the present disclosure, a detailed description of known functions and configurations will be omitted when it may obscure the subject matter of the present disclosure. In addition, in the drawings, portions which are not related to the description of the present disclosure will be omitted and similar portions are denoted by similar reference numerals.

The present disclosure proposes a technology for detecting safety information existing in an electronic document. Specifically, the present disclosure relates to a method and apparatus for utilizing text information existing in an electronic document and extracting data such as drug information and adverse event information in the form of a report based on an artificial intelligence (AI) model. In particular, the present disclosure relates to a method and apparatus for detecting an individual case safety report (ICSR) targeting text existing in an electronic document. The AI model-based safety information detection system according to the present disclosure may be called a literature-surfing ultimate system (LITUS).

In addition, the electronic document according to the present disclosure may include documents such as portable document format (PFD), web page, e-mail, scanned copy, image file, hangul word processor), txt, docx, and doc. In particular, in the case of a PDF document, there may be various types of formats. For example, there may be PDF/A (archiving), PDF/X (exchange), PDF/E (engineering), PDF/VT (variable and transactional), PDF/UA (universal accessibility), and the like. Also, electronic documents according to the present disclosure may be documents such as papers, reports, medical certificates, books, newspaper articles, journal articles, web pages, e-mails and the like.

Also, the present disclosure is to detect and extract an ICSR from an electronic document. In order to monitor the safety of drugs, in addition to direct investigation and research, it is necessary to search for adverse events occurring in drugs through the literature and write a report. However, if an expert reads and detects the ICSR one by one, too much time is consumed and the work is performed inefficiently. These problems can be improved through the present disclosure. For example, according to the present disclosure, it is possible to more easily process a document that is difficult to understand without professional training as an electronic document written in technical terms. In addition, a vast amount of documents issued in real time can be processed more efficiently.

The present disclosure may be applied to various types of electronic documents, and is not limited to the above examples.

FIG. 1 illustrates a structure of a system that provides a safety information detection method according to an embodiment of the present disclosure.

Referring to FIG. 1, the system includes a user device 110a, a user device 110b, and a server 120 connected to a communication network. Although FIG. 1 illustrates two user devices 110a and 110b, three or more user devices may exist.

The user device 110a and the user device 110b are used by users who want to detect safety information in an electronic document using a platform according to an embodiment of the present disclosure. Here, the platform may refer to an operating system constituting a system that provides a safety information detection method according to the present disclosure. The user devices 110a and 110b may obtain input data (e.g., e-mail, user input, electronic documents, etc.), transmit the input data to the server 120 through the communication network, and interact with the server 120. Each of the user devices 110a and 110b may include a communication unit for communication, a storage unit for storing data and programs, a display unit for displaying information, an input unit for user input, and a processor for control. For example, each of the user devices 110a and 110b may be a general-purpose device (e.g., a smartphone, a tablet, a laptop computer, a desktop computer) or a platform-specific access terminal in which an application or program for platform access is installed.

The server 120 provides a platform according to embodiments of the present disclosure. The server 120 provides various functions for a safety information detection platform in an electronic document and may operate an artificial intelligence model. An example of an artificial neural network applicable to the present disclosure will be described with reference to FIG. 4 below. In addition, the server 120 may perform learning for the artificial intelligence model using learning data. According to various embodiments of the present disclosure, the server 120 stores a plurality of artificial intelligence models for various analysis tasks included in the procedure for detecting safety information in the electronic document and selectively uses at least one of the artificial intelligence models if necessary. used selectively. Here, the server 120 may be a local server existing in a local network or a remote access server (e.g., a cloud server) connected through an external network. The server 120 may include a communication unit for communication, a storage unit for storing data and programs, and a processor for control.

Figure 2:
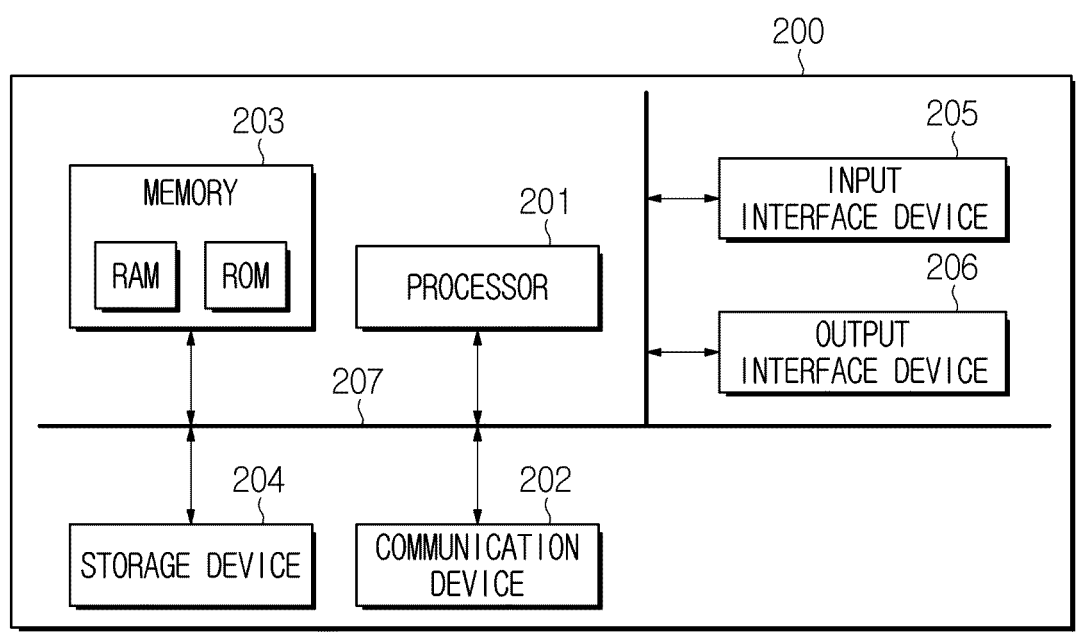
FIG. 2 illustrates a structure of an apparatus according to an embodiment of the present disclosure.

FIG. 2 illustrates a structure of an apparatus according to an embodiment of the present disclosure. The apparatus 200 is a functional unit that uses a common storage space for data necessary for program execution. The apparatus 200 may include at least one computer and software associated therewith. The apparatus 200 may be understood as a structure of the server 120 of FIG. 1.

Referring to FIG. 2, the apparatus 200 includes at least one of a processor 201, a communication device 202, a memory 203, a storage device 204, an input interface device 205 or an output interface device 206, which communicate through a bus 207.

The processor 201 is hardware having a function of handling and/or processing various types of information within the apparatus 200. The processor 201 may be a semiconductor device that executes commands stored in a central processing unit (CPU), the memory 203 and/or the storage device 204.

The communication device 202 is a data transmission device for exchanging data with other devices or systems in data communication. The communication device 202 may include a data input/output device or a communication control device. For example, the communication device 202 enables communication of voice, video, and text data between the data system and other devices.

The memory 203 is a storage device capable of storing information. The information includes programs or software necessary for the operation of the apparatus 200, data generated during operation, and the like. The memory 203 may include a read only memory (ROM) and a random access memory (RAM). Here, the RAM may load data, process what is necessary, and store changes back. The ROM is a read-only storage device, and data stored in the ROM may be stored permanently or semi-permanently.

The storage device 204 may store various types of information processed in the apparatus 200. The storage device 204 may include various forms of volatile or non-volatile storage media.

The input interface device 205 may detect commands from the user and allow the user to operate the system. In addition, the output interface device 206 may display the result of the user's use of the system. The input interface device 205 and the output interface device 206 may be user interfaces (Ills).

The steps of a method or algorithm described in connection with the embodiments described herein may be directly embodied in a hardware or software module executed by the processor 201, or a combination of the two. A software module may be resided in a storage medium (i.e., the memory 203 and/or the storage device 204) such as a RAM memory, a flash memory, a ROM memory, an erasable programmable read only memory (EPROM), an electrically erasable programmable read only memory (EEPROM), a register, a hard disk, a detachable disc or a CD-ROM.

An exemplary storage medium is coupled to the processor 201, and the processor 201 may read information from the storage medium, and write information to the storage medium. Alternatively, the storage medium may be integral with the processor 201. The processor 201 and the storage medium may reside within an application specific integrated circuit (ASIC). The ASIC may reside in a user terminal. Alternatively, the processor and the storage medium may reside in a user terminal as separate components.

Figure 3:
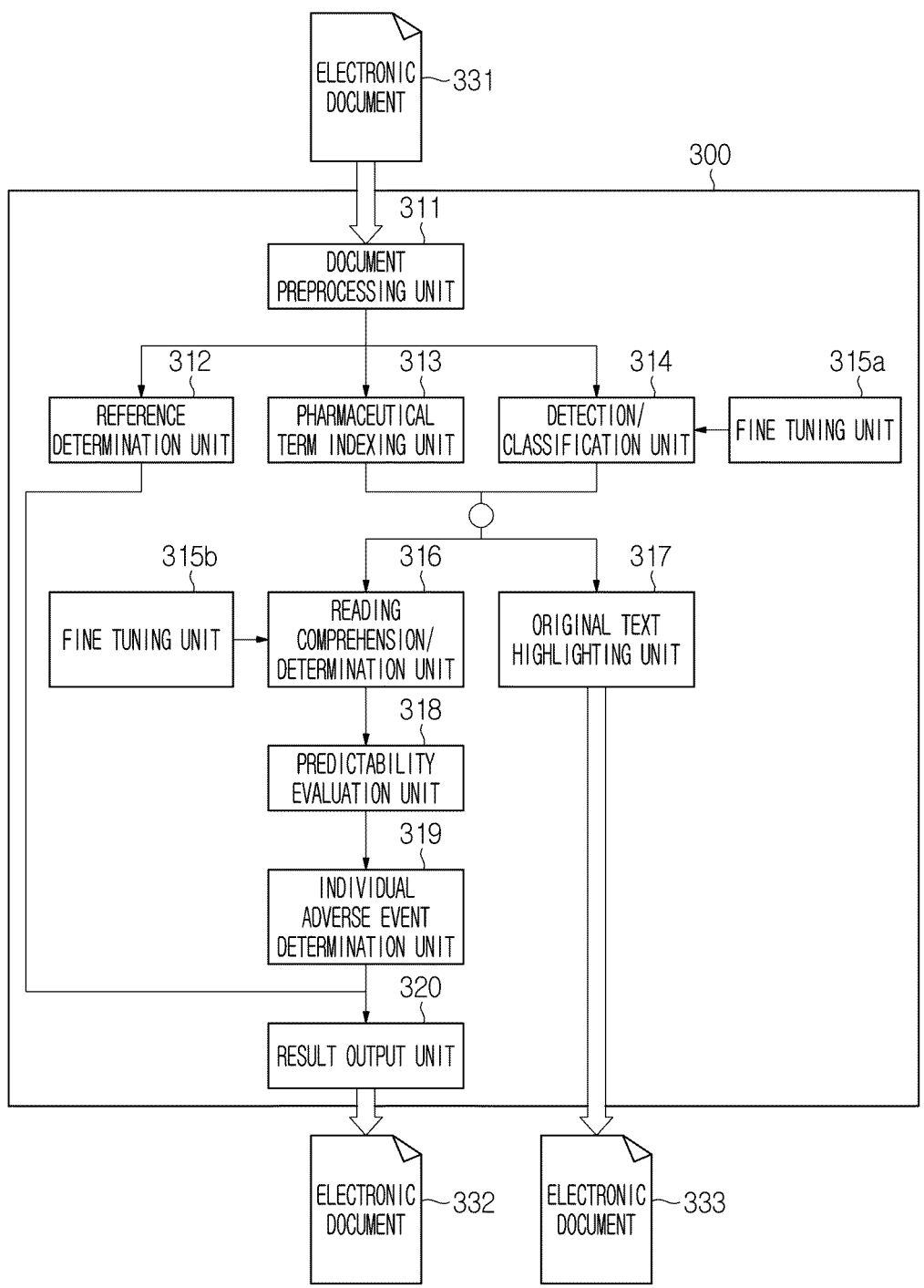
FIG. 3 illustrates a functional structure of an apparatus for detecting safety information in an electric document based on an artificial intelligence (AI) model according to an embodiment of the present disclosure.

FIG. 3 illustrates a functional structure of an apparatus for detecting safety information in an electric document based on an artificial intelligence (AI) model according to an embodiment of the present disclosure. The apparatus for detecting the safety information in the electric document based on the AI model of FIG. 3 may be understood as the server 120 of FIG. 1.

Referring to FIG. 3, the apparatus for detecting the safety information in the electric document based on the AI model of FIG. 3 according to the present disclosure may include a document preprocessing unit 311, a reference determination unit 312, a pharmaceutical term indexing unit 313, a detection/classification unit 314, fine tuning units 315a and 315b, a reading comprehension/determination unit 316, an original text highlighting unit 317, a predictability evaluation unit 318, an individual adverse event determination unit 319, and a result output unit 320.

The document preprocessing unit 311 may preprocess an input electronic document 331. Specifically, when the input electronic document 331 is a file incapable of text processing, the document may be transformed into text data. In addition, text existing in the input electronic document 331 may be divided into sentence units for detection/classification and reading comprehension/determination. Here, the sentence is not required to have a grammatically complete form, and may have the form of a phrase or clause. In addition, the document preprocessing unit 311 may transform an abbreviation into a full term when the abbreviation exists in text existing in the electronic document.

The reference determination unit 312 may check whether a previously reviewed reference exists in a list of references existing in the document received from the document preprocessing unit 311. To this end, it is possible to detect whether the list of references exists in the document received from the document preprocessing unit 311. If the list of references is detected, the reference determination unit 312 may check whether another reference that has already been reviewed exists in the list of detected references. That is, the reference determination unit 312 may check whether or not a previously reviewed document is referenced in a document currently being processed. In particular, the reference determination unit 312 may check whether or not a previously reviewed document has been referenced for the text that has not been transformed into the full term by the document preprocessing unit 311, but the present disclosure is not limited thereto. Accordingly, the apparatus may more effectively review adverse events of drugs by checking whether the previously reviewed reference has been referenced. In particular, by checking whether the previously reviewed document has been referenced, the apparatus may check a review paper including several original documents, thereby filtering duplicate cases. Here, the review paper may refer to a document that summarizes existing documents. According to another embodiment of the present disclosure, the reference determination unit 312 may check whether a reference exists using an original text that has not undergone document preprocessing.

The pharmaceutical term indexing unit 313 may receive the document preprocessed by the document preprocessing unit 311. Accordingly, the pharmaceutical term indexing unit 313 may index pharmaceutical information included in the received document. At this time, the pharmaceutical term indexing unit 313 may perform comparison with a term list in order to index pharmaceutical information. Here, the term list may mean a list consisting of term names and codes. In addition, the indexing of pharmaceutical information may be a process of storing at least one of a data name, a data size, a data attribute, or a data recording location of the pharmaceutical information.

The detection/classification unit 314 may detect and classify sentences existing in the document preprocessed by the document preprocessing unit 311 using a classification model generated by the fine tuning unit 315a. Specifically, the classification model may classify given data by category. Accordingly, the classification model may classify sentences by classification labels through various classification algorithms.

The fine tuning units 315a and 315b may include a fine tuning unit 315a for the detection/classification unit 314 and a fine tuning unit 315b for the reading comprehension/determination unit 316. The fine tuning units 315a and 315b may fine-tune a pretrained BERT (Bidirectional Encoder Representations from Transformers) model using datasets such as drugs and adverse events. Specifically, fine-tuning may be an additional training process that re-tunes parameters to understand a more specific task for each purpose.

The reading comprehension/determination unit 316 may find and determine desired information using a machine reading comprehension model generated by the fine tuning unit 315b. Specifically, the reading comprehension/determination unit 316 may infer correct answer text using question data based on data extracted from the pharmaceutical term indexing unit 313. In addition, the reading comprehension/determination unit 316 may find and determine desired information from sentences detected and classified by the detection/classification unit 314 or sentences existing near the sentence. Here, the sentences existing near the sentence may be at least one of a sentence preceding a reference sentence, a sentence following the reference sentence, or a sentence existing in the same paragraph, and the present disclosure is not limited thereto. For example, if question data 'what drug did you stop' is generated, the reading comprehension/determination unit 316 may infer the correct answer text through the structure of the context. The reading comprehension/determination unit 316 may determine whether to process the correct answer by expressing the inferred correct answer text as a score value and then comparing the score value with a reference value.

The original text highlighting unit 317 may find the pharmaceutical information indexed by the pharmaceutical term indexing unit 313 or the sentence detected by the detection/classification unit 314 in the electronic document. After that, the original text highlighting unit 317 may highlight texts or sentences within the sentence. Accordingly, after highlighting the texts or sentences in the electronic document, the original text highlighting unit 317 may output the electronic document 333. In this case, the format of the output electronic document may be the same as that of the input electronic document 331. However, the present disclosure is not limited thereto, and the original text highlighting unit 317 may output documents in various formats.

For example, the original text highlighting unit 317 may output the output file as an electronic document 333 in various formats such as PDF, docx, hwp, and image file.

The predictability evaluation unit 318 may evaluate predictability through information received from the reading comprehension/determination unit 316. Here, the information received from the reading comprehension/determination unit 316 may include pharmaceutical information or adverse event information. According to the present disclosure, it is possible to check whether or not the adverse event information for a specific drug input to the predictability evaluation unit 318 exists in the adverse event searched on a drug approval information site. Here, the adverse event searched on the drug approval information site may be a drug approval label posted on the regulatory authority site of each country. For example, the drug approval label may include precautions for use, summary of product characteristics (SmPC), target product profile (TPP), and the like. If it exists on the drug approval information site, the adverse event information may be determined to be a predictable side effect. On the other hand, if adverse event information for the specific drug does not exist in the adverse event searched on the drug approval information site, the adverse event information may be determined to be an unpredictable side effect.

The individual adverse event determination unit 319 inputs the information processed and extracted by the predictability evaluation unit 318 or reference determination unit 312 to an Individual Case Safety Report (ICSR) determination system, and determine whether the document corresponds to an ICSR based on the feedback output. Here, the ICSR is a document for reporting suspected side effects of a drug that occur in a single patient at a specific time point. Accordingly, when the information processed and extracted by the predictability evaluation unit 318 or the reference determination unit 312 is input to the individual adverse event report determination system, the ICSR determination system determines whether the document information is an ICSR and outputs the result. According to another embodiment of the present disclosure, the individual adverse event determination unit 319 may also input the information processed and extracted by the reading comprehension/determination unit 316 to the individual adverse event report determination system, and determine whether the document corresponds to an ICSR based on the feedback output, and the embodiment of the present disclosure is not limited thereto.

The result output unit 320 may generate a report using data generated through the pharmaceutical term indexing unit 313, the reference determination unit 312, the detection/classification unit 314, the reading comprehension/determination unit 316, the predictability evaluation unit 318, and the individual adverse event determination unit 319. Accordingly, the result output unit 320 may output the generated report in the form of an electronic document 332. Here, the generated report may include the results determined by the individual adverse event determination unit 319 and the basis for determination. The format of the electronic document 332 output from the result output unit 320 may be the same as that of the input electronic document 331. However, the present disclosure is not limited thereto, and the result output unit 320 may output electronic documents in various formats. For example, the output electronic documents 332 may be electronic documents in various formats such as PDF, docx, hwp, and image file.

Figure 4:
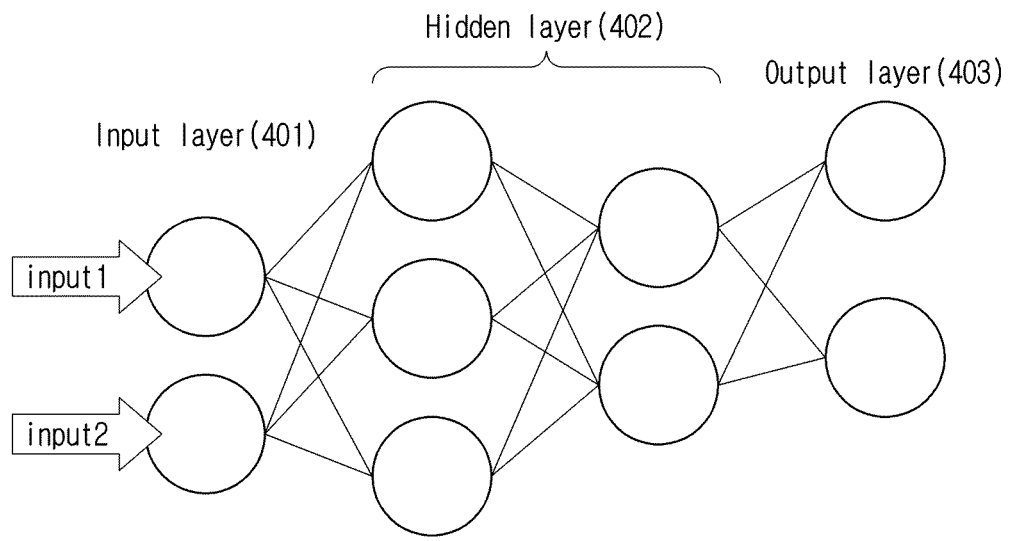
FIG. 4 illustrates a structure of an artificial neural network applicable to a system according to an embodiment of the present disclosure.

FIG. 4 illustrates a structure of an artificial neural network applicable to a system according to an embodiment of the present disclosure.

The artificial neural network shown in FIG. 4 may be understood as a structure of artificial intelligence (AI) models stored in the server 120 or a third apparatus capable of interworking with the server 120. In addition, the artificial neural network shown in FIG. 4 may be understood as a structure of BERT models used in the present disclosure, and may be understood as a structure of a feed forward neural network (FFNN) within the BERT model.

Referring to FIG. 4, the artificial neural network includes an input layer 401, at least one hidden layer 402, and an output layer 403. Each of the layers 401, 402 and 403 is composed of a plurality of nodes, and each node is connected to output of at least one node belonging to a previous layer. Each node calculates an inner product of an output value of each of the nodes in the previous layer and a connection weight corresponding thereto, and then sends an output value multiplied with a non-linear activation function to at least one neuron in a next layer.

The artificial neural network shown in FIG. 4 may be formed by learning (e.g., machine learning, deep learning, etc.). In addition, artificial neural network models used in various embodiments of the present disclosure may include at least one of a fully convolutional neural network, a convolutional neural network, a recurrent neural network, a restricted Boltzmann machine (RBM) or a deep belief neural network (DBN), but is not limited thereto. Alternatively, machine learning methods other than deep learning may also be included. Alternatively, a hybrid model which is a combination of deep learning and machine learning may also be included. For example, by applying a deep learning-based model, features of an image are extracted, and a machine learning-based model may be applied when classifying or recognizing an image based on the extracted features. The machine learning-based model may include a Support Vector Machine (SVM), AdaBoost, and the like, but is not limited thereto.

Figure 5:
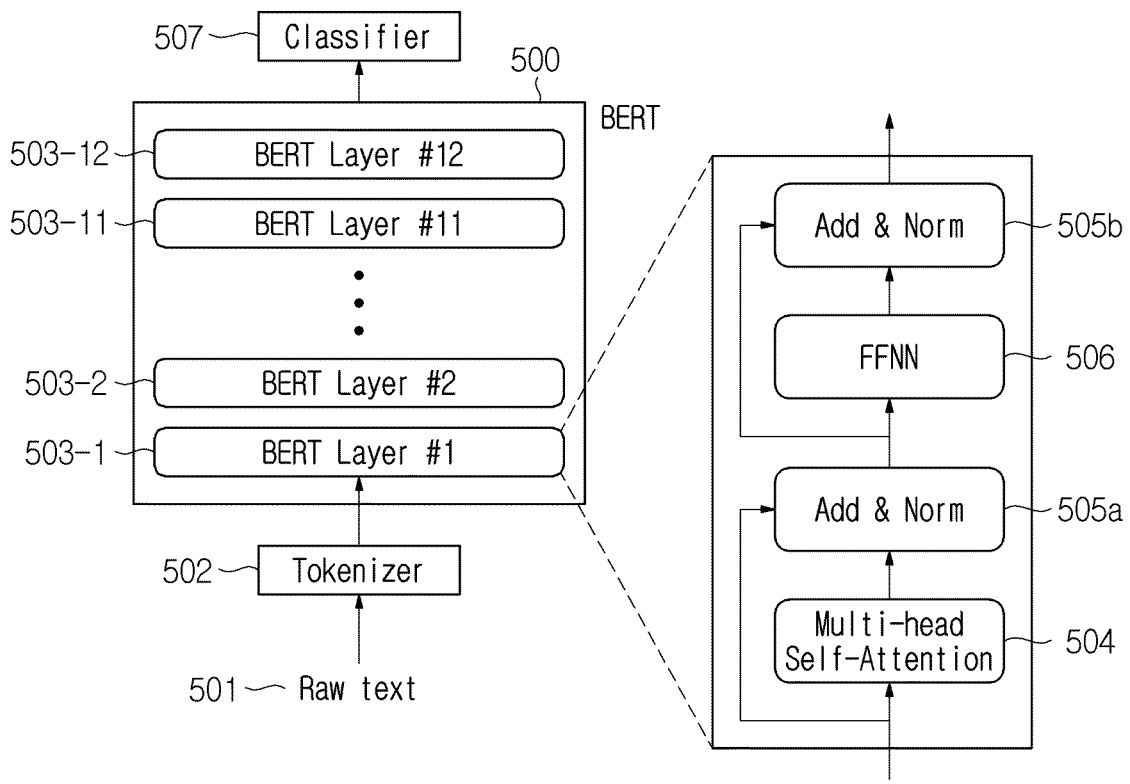
FIG. 5 illustrates a BERT model for a detection/classification unit according to an embodiment of the present disclosure.

FIG. 5 illustrates a BERT model for a detection/classification unit according to an embodiment of the present disclosure. According to the present disclosure, the BERT model for the detection/classification unit may be a classification model.

Referring to FIG. 5, raw text 501 may be input to a tokenizer 502. Here, the tokenizer 502 may tokenize text existing in an electronic document. Specifically, tokenization means dividing a sentence into minimum semantic units and transforming them into numbers so that computers may recognize them. That is, the tokenizer 502 may divide the sentence into several words. Then, the tokenizer 502 may transform the separated words into numbers. At this time, the words transformed into numbers may be called tokens. Accordingly, words transformed into numbers may be input to the BERT model 500. Also, according to an embodiment of the present disclosure, input of the BERT model 500 may be an embedding vector. The embedding vector means that it is vectorizal to effectively express the token. According to another embodiment of the present disclosure, the words separated by the tokenizer 502 may be further divided into several words or individual letters as needed.

The BERT model 500 may consist of 12 BERT layers 503-1 to 503-12. According to another embodiment of the present disclosure, the BERT model 500 may consist of 24 BERT layers. Here, the BERT layers may be referred to as transformer encoders, transformers, or encoders. Each of the BERT layers 503-1 to 503-12 may perform multi-head self attention 504, residual connection and layer normalization (add & norm) 505a, FFNN (Feed Forward Neural Network) 506 and residual connection and layer normalization (add & norm) 505b.

The multi-head self-attention 504 means using self-attention in parallel. The self-attention may obtain how much correlation the words input to the BERT model 500 have with each other. More specifically, the self-attention may extract the vector values of each word, and the correlation may be identified through matrix calculation of these vector values. Accordingly, the present disclosure may more effectively learn the context. In addition, by multiplying self-attention, accuracy can be increased and the possibility of error occurrence can be reduced.

The FFNN 506 may serve to train the BERT model 500. The FFNN 506 may include an input layer, at least one hidden layer, and an output layer. Also, the FFNN 506 may be a neural network in which operations are developed from an input layer to an output layer. The FFNN 506 may minimize errors in output values through iterative updating of weights during learning. According to an embodiment of the present disclosure, the FFNN 506 may receive a vector output from the multi-head self-attention 504 as input. Also, the FFNN 506 may make the vector sequence of every word easy to be processed in the next transformer encoder.

Residual connection and layer normalization 505a and 505b may play a role of connecting input and output between the multi-head self-attention 504 and the FFNN 506. Specifically, residual connection means adding the input and output of a sub-layer. For example, residual connection may mean adding the input and output of the multi-head self-attention 504. Residual connection may also mean adding the input and output of the FFNN 506. Layer normalization refers to obtaining an average and variance for results obtained through residual connection and performing normalization using these results. Residual connection and layer normalization 505a and 505b may prevent a layer-to-layer variation from increasing. In addition, residual connection and layer normalization 505a and 505b may help the BERT model 500 learn quickly. The output of the BERT model 500 can be input to the classifier 507. The classifier 507 can output which classification the raw data 501 belongs to based on the output of the BERT model 500. For example, the classifier 507 can classify the raw data 501 into one of first to sixteenth classifications based on the output of the BERT model.

The BERT model 500 for the detection/classification unit 314 may be fine-tuned by the fine tuning unit 315a. That is, the BERT model 500 for the detection/classification unit 314 may be a classification model generated by the fine tuning unit 315a. The fine tuning unit 315a may perform transfer learning on the pretrained BERT model 500 to modify existing weights again. The fine tuning unit 315a may build learning data or dataset by using documents collected from document sites such as PUBMED or KOREAMED. Also, the classification model learning data for learning the fine tuning unit 315a may include sentences and classification labels of the sentences. Here, the classification labels may include classification of data of a sentence containing subject identifier (ID) (first classification), a sentence containing reporter identifier (ID) (second classification), a sentence containing current drug (third classification), a sentence containing past drug (fourth classification), a sentence containing suspect drug (fifth classification), a sentence containing concomitant drug (sixth classification), a sentence containing indication (seventh classification), a sentence containing adverse event (eighth classification), a sentence containing medical history (ninth classification), a sentence containing action with drug (tenth classification), a sentence containing outcome (eleventh classification), a sentence containing de-challenge (twelfth classification), a sentences containing rechallenge (thirteenth classification), a sentence containing causality (fourteenth classification), a sentence containing lab test (fifteenth classification) and a sentence without any information (sixteenth classification). Accordingly, classification model learning data and/or datasets may be used for fine-tuning of the BERT model. According to an embodiment of the present disclosure, when fine tuning is performed using the first to sixteenth classifications, the detection/classification unit 314 may output sentences classified into the first to sixteenth classifications as a result.

Figure 6:
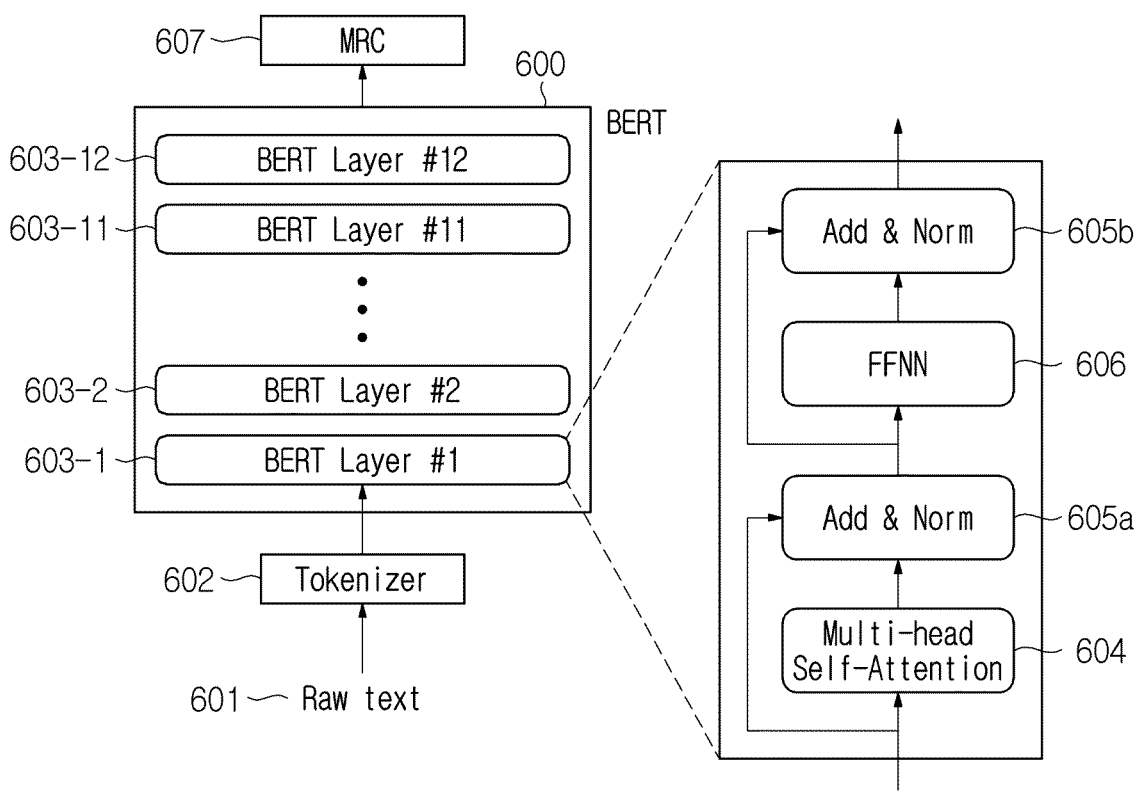
FIG. 6 illustrates a BERT model for a reading comprehension/determination unit according to an embodiment of the present disclosure.

FIG. 6 illustrates a BERT model for a reading comprehension/determination unit according to an embodiment of the present disclosure. According to the present disclosure, the BERT model for the reading comprehension/determination unit may be a machine reading comprehension model.

Referring to FIG. 6, raw text 601 may be input to a tokenizer 602. Here, the tokenizer 602 may tokenize text existing in an electronic document. Specifically, tokenization means dividing a sentence into minimum semantic units and transforming them into numbers so that computers may recognize them. That is, the tokenizer 602 may divide a sentence into several words. Then, the tokenizer 602 may transform the separated words into numbers. At this time, the words transformed into numbers may be called tokens. Accordingly, words transformed into numbers may be input to the BERT model 600. Also, according to an embodiment of the present disclosure, input of the BERT model 600 may be an embedding vector. The embedding vector means that it is vectorized to effectively represent a token. According to another embodiment of the present disclosure, the words separated by the tokenizer 602 may be further divided into several words or individual letters as needed.

The BERT model 600 may consist of 12 BERT layers 603-1 to 603-12. According to another embodiment of the present disclosure, the BERT model 600 may consist of 24 BERT layers. Here, BERT layers may be referred to as transformer encoders, transformers or encoders. Each of the BERT layers 603-1 to 603-12 may perform multi-head self attention 604, residual connection and layer normalization (add & norm) 605a and 605b and FFNN (Feed Forward Neural Network) 606.

The multi-head self-attention 604 means using self-attention in parallel. The self-attention may obtain how much correlation the words input to the BERT model 600 have with each other. More specifically, the self-attention may extract the vector values of each word, and determine the correlation through matrix calculation of these vector values. Accordingly, the present disclosure can more effectively learn the context. In addition, by multiplying self-attention, accuracy can be increased and the possibility of error occurrence can be reduced.

The FFNN 606 may serve to train the BERT model 600. The FFNN 606 may include an input layer, at least one hidden layer, and an output layer. Also, the FFNN 606 may be a neural network in which operations are developed from an input layer to an output layer. The FFNN 606 may minimize errors in output values through iterative updating of weights during learning. According to an embodiment of the present disclosure, the FFNN 606 may receive a vector output from the multi-head self attention 604 as input. Also, the FFNN 606 make the vector sequence of every word easy to be processed in the next transformer encoder.

Residual connection and layer normalization 605a and 605b may play a role of connecting input and output between the multi-head self-attention 604 and the FFNN 606. Specifically, residual connection means adding the input and output of a sub-layer. For example, residual connection may mean adding the input and output of the multi-head self-attention 604.

Residual connection may also mean adding the input and output of the FFNN 606. Layer normalization refers to obtaining an average and variance for results obtained through residual connection and performing normalization using these results. Residual connection and layer normalization 605a and 605b may prevent a layer-to-layer variation from increasing. In addition, residual connection and layer normalization 605a and 605b may help the BERT model 600 learn quickly. Based on the output of the BERT model 600, the machine reading comprehension (MRC) 607 may output correct answer text associated with the raw data 601, express the correct answer text as a score, and compare the score to a baseline.

The BERT model 600 for the reading comprehension/determination unit 316 may be fine-tuned by the fine tuning unit 315b. That is, the BERT model 600 for the reading comprehension/determination unit 316 may be a machine reading comprehension model generated by the fine tuning unit 315b. The fine tuning unit 315b may perform transfer learning on the pretrained BERT model 600 to modify the existing weights again. The fine tuning unit 315b may build learning data or dataset using documents collected from document sites such as PUBMED or KOREAMED. In addition, the reading comprehension model learning data for learning the fine tuning unit 315b may include a paragraph, a question, and an answer. Here, the answer may include information suitable for the question existing in the paragraph. Accordingly, the reading comprehension model learning data and/or dataset may be used for fine-tuning of the BERT model 600.

Figure 7:
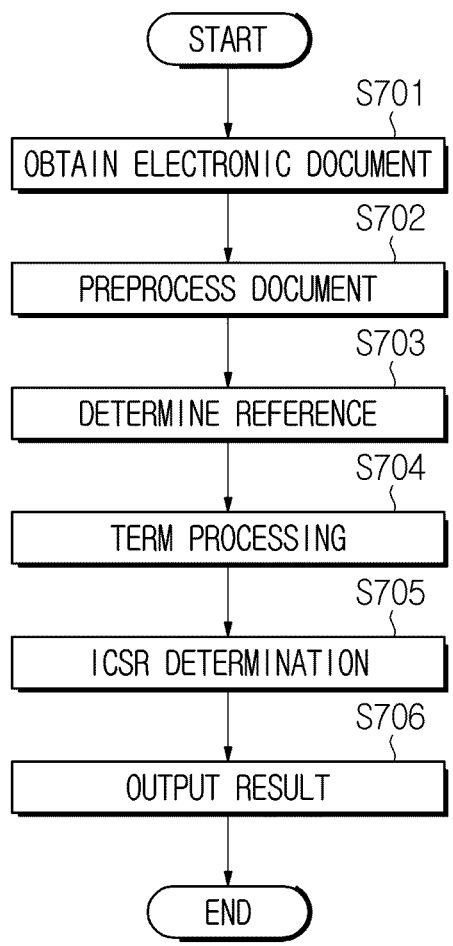
FIG. 7 is a flowchart of AI safety information detection in an electronic document according to an embodiment of the present disclosure.

FIG. 7 is a flowchart of AI safety information detection in an electronic document according to an embodiment of the present disclosure. FIG. 7 illustrates an operating method of an apparatus (e.g., the server 120, the apparatus 200, and the apparatus 300 for detecting safety information in the electronic document).

Referring to FIG. 7, in S701, the apparatus may obtain an electronic document. Here, the electronic document may include documents such as PDF, web page, e-mail, scanned copy, image file, hwp, txt, docx, and doc. In particular, in the case of a PDF document, there may be various types of formats. Also, the electronic document according to the present disclosure may include a paper, a report, a medical certificate, and the like. The present disclosure may be applied to various types of electronic documents, and is not limited to the above examples. According to an embodiment of the present disclosure, the apparatus may obtain the electronic document through a wired or wireless communication method. For example, the apparatus may obtain the electronic document through file upload within the platform, e-mail, external hard drive, universal serial bus (USB), external/internal solid state drive (SSD), and the like.

In S702, the apparatus may preprocess the obtained electronic document. Specifically, the apparatus may transform text existing in the electronic document into text data. For example, if the obtained electronic document is a non-optical character reader (OCR)-processed document, the apparatus may OCR-process the document. Then, the transformed text data may be divided into sentence units. Here, the sentence is not required to have a grammatically complete form, and may have the form of a phrase or clause. In addition, when an abbreviation exists in the transformed text data, the apparatus may generate a data pair list by extracting an abbreviation and a full term. In addition, the abbreviation existing in text data may be transformed into the full term by using an abbreviation-full term pair.

In S703, the apparatus may determine a reference. Here, determination of the reference may refer to a process of determining whether a list of references written in text data corresponds to another previously reviewed literature. Specifically, the apparatus may detect whether a list of references exists in the text data transformed in S702. Accordingly, when the list of references exists, the apparatus may check whether another literature that have already been reviewed exists in the list of references. Also, the apparatus may output the result to the result output unit.

In S704, the apparatus may perform term processing. Here, term processing may include a process of indexing pharmaceutical terms and/or a process of detecting and classifying a sentence existing in an electronic document. Specifically, if pharmaceutical information exists in the abbreviation-transformed text in S702, the apparatus may index the pharmaceutical information. Here, the process of indexing the pharmaceutical information may be a process of separately storing at least one of a data name, a data size, a data attribute, or a data recording location of the pharmaceutical information. On the other hand, text that has not been subjected to abbreviation transform may be classified according to classification labels by a classification model. Here, the classification label may be the first to sixteenth classification, and the present disclosure is not limited thereto.

In S705, the apparatus may perform ICSR determination. Specifically, ICSR determination may include a process of reading and determining a sentence existing in the electronic document, a process of evaluating predictability, and a process of determining individual adverse events. The process of reading and determining the sentence existing in the electronic document may be a process of inferring correct answer text for question data using a machine reading comprehension model. When a score value of the correct answer text is greater than or equal to a reference value, the correct answer text may be processed as a correct answer, and when the score value of the correct answer text is less than the reference value, the correct answer text may not be processed as a correct answer. In the predictability evaluation process, if pharmaceutical information and adverse event information exist in the electronic document, adverse events may be searched in the approval information of the drug and the results may be output. The process of determining individual adverse events may use the information output from the predictability evaluation process to determine whether the information corresponds to the ICSR. In order to determine whether it corresponds to the ICSR, the apparatus may input the information output in the predictability evaluation process to the ICSR determination system. Here, the ICSR determination system may be based on a retrained artificial intelligence model by setting weight items using the feedback results of the medical and pharmaceutical expert group and generating new learning data through statistical techniques using this.

In S706, the apparatus may output a final report. Specifically, the apparatus may generate a report using data generated through the pharmaceutical term indexing unit 313, the reference determination unit 312, the detection/classification unit 314, the reading comprehension/determination unit 316, the predictability evaluation unit 318, and the individual adverse event determination unit 319. Here, the format of the report may be hwp, pdf, txt, docx, doc, etc., and the present disclosure is not limited thereto. In addition, the generated report may be downloaded, and may be transmitted through means such as application programming interface (API) and e-mail.

Figure 8:
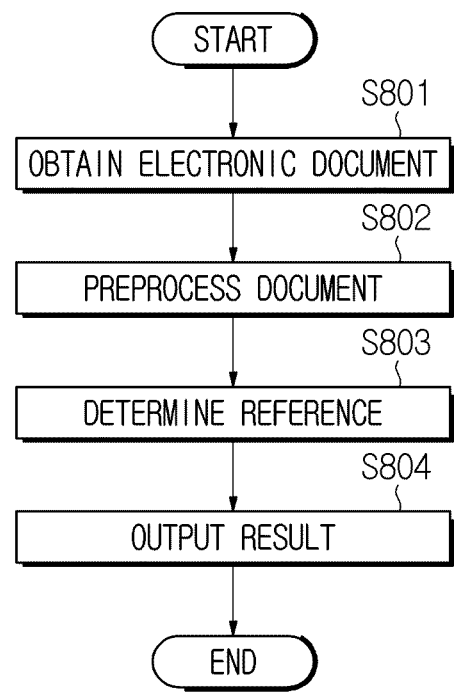
FIG. 8 is a flowchart for determining a reference in an electronic document according to an embodiment of the present disclosure.

FIG. 8 is a flowchart for determining a reference in an electronic document according to an embodiment of the present disclosure. FIG. 8 illustrates an operating method of an apparatus (e.g., the server 120, the apparatus 200, or the apparatus 300 for detecting safety information in the electronic document).

Referring to FIG. 8, in S801, the apparatus may obtain an electronic document. Here, the electronic document may include documents such as PDF, web page, e-mail, scanned copy, image file, hwp, txt, docx, and doc. In particular, in the case of a PDF document, there may be various types of formats. Also, the electronic document according to the present disclosure may include a paper, a report, a medical certificate, and the like. The present disclosure may be applied to various types of electronic documents, and is not limited to the above examples. According to an embodiment of the present disclosure, the apparatus may obtain the electronic document through a wired or wireless communication method. For example, the apparatus may obtain the electronic document through file upload within the platform, e-mail, external hard drive, universal serial bus (USB), external/internal solid state drive (SSD), and the like.

In S802, the apparatus may preprocess the obtained electronic document. Specifically, the apparatus may transform text existing in the electronic document into text data. For example, if the obtained electronic document is a non-optical character reader (OCR)-processed document, the apparatus may OCR-process the document. Then, the transformed text data may be divided into sentence units. Here, the sentence is not required to have a grammatically complete form, and may have the form of a phrase or clause. In addition, when an abbreviation exists in the transformed text data, the apparatus may transform the abbreviation into a full term.

In S803, the apparatus may determine a reference. Here, determination of the reference may refer to a process of determining whether or not the reference is described in the text data Specifically, the apparatus may detect whether a list of references exists in the transformed text data in the document preprocessing step. As a result of detection by the apparatus, if the list of references exists, the list of references may be separated. Accordingly, the apparatus may check whether another literature that have already been reviewed exists in the list of references. In particular, the apparatus may detect whether another literature that has already been reviewed exists in the text data that has not been transformed into the full term in S802. Also, the apparatus may output the result to the result output unit. Here, another literature information that has been already reviewed may be obtained from a database or another system to which the system is connected, or list-type data may be utilized. The apparatus may use information such as document title, DOI (Digital Object Identifier), and the like to identify the same documents. According to another embodiment of the present disclosure, in S802, the apparatus may detect whether another literature that has already been reviewed exists in the text data transformed into the full term, but the present disclosure is not limited thereto.

In S804, the apparatus may output a final report. Specifically, the apparatus may generate the report using data generated through the reference document determination process. Here, the format of the report may be hwp, pdf, txt, docx, doc, etc., and the present disclosure is not limited thereto. In addition, the generated report may be downloaded, and may also be transmitted through methods such as API or e-mail.

Figure 9:
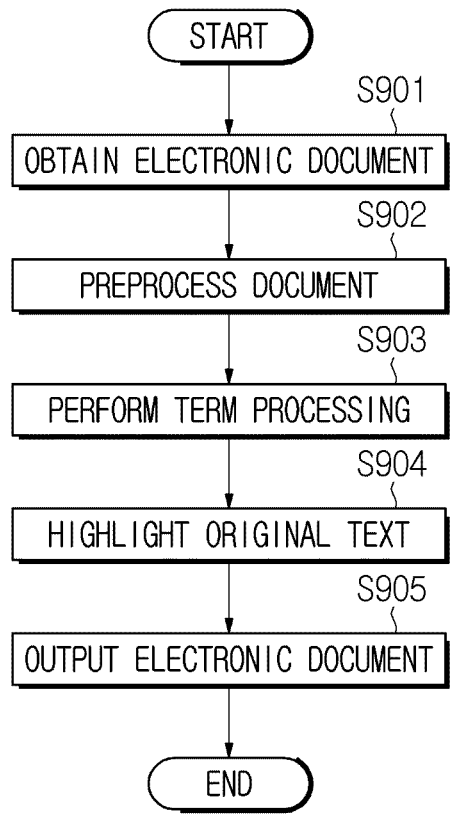
FIG. 9 is a flowchart illustrating a process of highlighting text in an electronic document according to an embodiment of the present disclosure.

FIG. 9 is a flowchart illustrating a process of highlighting text in an electronic document according to an embodiment of the present disclosure. FIG. 9 illustrates an operating method of an apparatus (e.g., the server 120, the apparatus 200, or the apparatus 300 for detecting safety information in the electronic document).

Referring to FIG. 9, in S901, the apparatus may obtain an electronic document. Here, the electronic document may include documents such as PDF, web page, e-mail, scanned copy, image file, hwp, txt, docx, and doc. In particular, in the case of a PDF document, there may be various types of formats. Also, the electronic document according to the present disclosure may include a paper, a report, a medical certificate, and the like. The present disclosure may be applied to various types of electronic documents, and is not limited to the above examples. According to an embodiment of the present disclosure, the apparatus may obtain the electronic document through a wired or wireless communication method. For example, the apparatus may obtain the electronic document through file upload within the platform, e-mail, external hard drive, universal serial bus (USB), external/internal solid state drive (SSD), and the like.

In S902, the apparatus may preprocess the obtained electronic document. Specifically, the apparatus may transform text existing in the electronic document into text data. For example, if the obtained electronic document is a non-optical character reader (OCR)-processed document, the apparatus may OCR-process the document. Then, the transformed text data may be divided into sentence units. Here, the sentence is not required to have a grammatically complete form, and may have the form of a phrase or clause. In addition, when an abbreviation exists in the transformed text data, the apparatus may transform the abbreviation into a full term.

In S903, the apparatus may perform term processing. Specifically, the apparatus may perform term processing through detection/classification and pharmaceutical term index. Here, detection/classification means outputting a sentence classified according to classification labels. In addition, the pharmaceutical term indexing means indexing of pharmaceutical information included in the electronic document. Here, the process of indexing the pharmaceutical information may be a process of separately storing at least one of a data name, a data size, a data attribute, or a data recording location of the pharmaceutical information. A more specific detection/classification method and pharmaceutical term indexing method will be described later.

In S904, the apparatus may perform a process of highlighting original text. Specifically, the apparatus may find sentences classified according to classification labels detected in the detection/classification step and terms indexed by the pharmaceutical term indexing unit 313 in the original electronic document. When the apparatus finds the terms in the original electronic document, it may highlight them. According to an embodiment of the present disclosure, the apparatus may perform highlighting using different colors for each of the first to sixteenth classifications of the dataset for fine tuning. The apparatus according to the present disclosure may highlight the classified sentences while maintaining the original electronic document in its original state without deformation of the position of letters, deformation of images and tables included in the electronic document, and the like.

In S905, the apparatus may output the highlighted electronic document. Here, the electronic document may be output independently. Accordingly, the output highlighted electronic document may be more efficiently recognized. In addition, by comparing the final electronic document 332 output according to the present disclosure with the original text, the user's review process may be made convenient. In addition, even in long documents, it is possible to immediately check the part with ICSR information through highlighting of the original text, and a report may be prepared without checking the original text by extracting the core information of the ICSR.

According to an embodiment of the present disclosure, in the detection/classification step performed in S903, the document preprocessed in the document preprocessing step may be received. Accordingly, the apparatus may classify each sentence of the document by inputting the preprocessed document into the generated classification model. That is, the apparatus may determine which classification label the sentence to be classified belongs to. For example, if the sentence to be classified is classified as 'patient information', the apparatus may perform classification by determining that the sentence to be classified is a sentence including patient information and assigning a corresponding label. According to another embodiment, the sentence to be classified may be classified into first to sixteenth classification. Finally, the apparatus may output the sentence classified according to classification labels.

In the pharmaceutical term indexing step performed in S903, the pharmaceutical information existing in the electronic document may be indexed. Here, the process of indexing the pharmaceutical information may be a process of separately storing at least one of a data name, a data size, a data attribute, or a data recording location of the pharmaceutical information. Specifically, the apparatus may receive the document preprocessed in the document preprocessing step. Accordingly, the apparatus may index the pharmaceutical information included in the document by comparing terms in the preprocessed document with the term list. Here, the term list may be MedDRA, WHODrug, The International Statistical Classification of Diseases and Related Health Problems, ICD 11, Korean Classification of Diseases (KCD8), KOrean Standard Terminology Of Medicine (KOSTOM), etc., and the present disclosure is not limited to this. In addition, the term list is an internationally commonly used list and may be composed of term names and codes. Thereafter, the apparatus may search for term names in the preprocessed document and search for matching terms. Accordingly, the term may be classified and extracted as a designated label. For example, WHODrug (World Health Organization Drug) is an international list of terms for medicines and substances. If a term included in the substance list of WHODrug is searched for, the term may be indexed and extracted as a 'substance' label.

Figure 10:
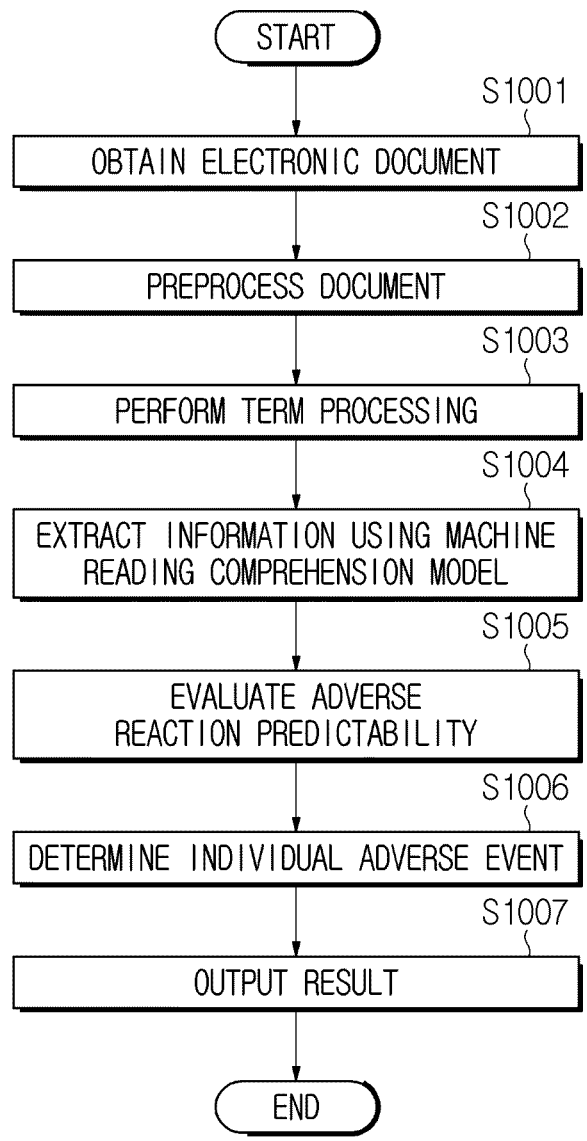
FIG. 10 is a flowchart of detection of AI safety information in an electronic document according to an embodiment of the present disclosure.

FIG. 10 is a flowchart of detection of AI safety information in an electronic document according to an embodiment of the present disclosure. FIG. 10 illustrates an operating method of an apparatus (e.g., the server 120, the apparatus 200, or the apparatus 300 for detecting safety information in the electronic document).

Referring to FIG. 10, in S1001, the apparatus may obtain an electronic document. Here, the electronic document may include documents such as PDF, web page, e-mail, scanned copy, image file, hwp, txt, docx, and doc. In particular, in the case of a PDF document, there may be various types of formats. Also, the electronic document according to the present disclosure may include a paper, a report, a medical certificate, and the like. The present disclosure may be applied to various types of electronic documents, and is not limited to the above examples. According to an embodiment of the present disclosure, the apparatus may obtain the electronic document through a wired or wireless communication method. For example, the apparatus may obtain the electronic document through file upload within the platform, e-mail, external hard drive, universal serial bus (USB), external/internal solid state drive (SSD), and the like.

In S1002, the apparatus may preprocess the obtained electronic document. Specifically, the apparatus may transform text existing in the electronic document into text data. For example, if the obtained electronic document is a non-optical character reader (OCR)-processed document, the apparatus may OCR-process the document. Then, the transformed text data may be divided into sentence units. Here, the sentence is not required to have a grammatically complete form, and may have the form of a phrase or clause. In addition, when an abbreviation exists in the transformed text data, the apparatus may transform the abbreviation into a full term.

In S1003, the apparatus may perform term processing. Specifically, the apparatus may perform term processing through the detection/classification step and the pharmaceutical term indexing step. Here, detection/classification means outputting sentences classified according to classification labels. In addition, the pharmaceutical term indexing means indexing of pharmaceutical information included in the electronic document. Here, the process of indexing the pharmaceutical information may be a process of separately storing at least one of a data name, a data size, a data attribute, or a data recording location of the pharmaceutical information.

In S1004, the apparatus may extract information using a machine reading comprehension model. Specifically, the apparatus may extract the information by matching relevant data using the machine reading comprehension model. According to an embodiment of the present disclosure, question data generated using data extracted in the pharmaceutical term indexing step may be input to the machine reading comprehension model generated by the fine tuning unit 315b. Here, the question data may be generated using a question sentence predefined by a pharmaceutical expert or directly input by a user based on the data extracted in the pharmaceutical term indexing step. That is, the question data may be generated using data previously generated by an external system. In addition, the sentence detected and classified in the detection/classification step or sentences near the sentence (hereinafter referred to as text data) may also be input to the machine reading comprehension model generated by the fine tuning unit 315b. The machine reading comprehension model may infer correct answer text from the text data by the input information. Relevant data information extracted through the machine reading comprehension model may be output to the predictability evaluation unit.

In S1005, the apparatus may evaluate adverse event predictability. Specifically, predictability evaluation may be processed by inputting the relevant data to the predictability evaluation unit 318 when there is drug information and adverse event information in the relevant data output in the reading/determination step. Accordingly, when drug-adverse event information is input, after searching for an adverse event in the drug approval information, whether or not there is an adverse event may be checked and the result may be output. Here, the drug approval information may be a label obtained through searching of a drug name after accessing a designated worldwide drug-related regulatory authority site in real time. Drug-related regulatory sites may include Drug Safety Country, Food and Drug Administration (FDA), European Medicines Agency (EMA), and the like. In addition, the label may include Summary of Product Characteristics (SmPC), precautions for use, patient information, product leaflet, and the like. In addition, a database connected to this system or a directly input dataset may be used as drug approval information, but the present disclosure is not limited thereto. If the apparatus fails to secure the data, it may be output as a result.

In S1106, the apparatus may determine an individual adverse event. Specifically, the apparatus may input the information processed and extracted in the predictability evaluation step and the reference determination step to the ICSR determination system. Accordingly, the apparatus may determine whether the information processed and extracted in the predictability evaluation step and the reference determination step corresponds to an ICSR. Here, the ICSR determination system may be a system based on an AI model. Specifically, the AI model constituting the ICSR determination system may set the feedback result of a group of experts majoring in medicine and pharmacy as a weighted item, and use it to generate new learning data through statistical techniques. In addition, the AI model constituting the ICSR determination system may be re-trained using newly generated learning data. Finally, the apparatus may determine whether the input information is an ICSR or not, and output the result.

In S1007, the apparatus may output a final report. Specifically, the apparatus may generate the report using data generated through the individual adverse event determination process. Here, the format of the report may be hwp, pdf, txt, docx, doc, etc., and the present disclosure is not limited thereto. In addition, the generated report may be downloaded, and may also be transmitted through methods such as API or e-mail.

Figure 11:
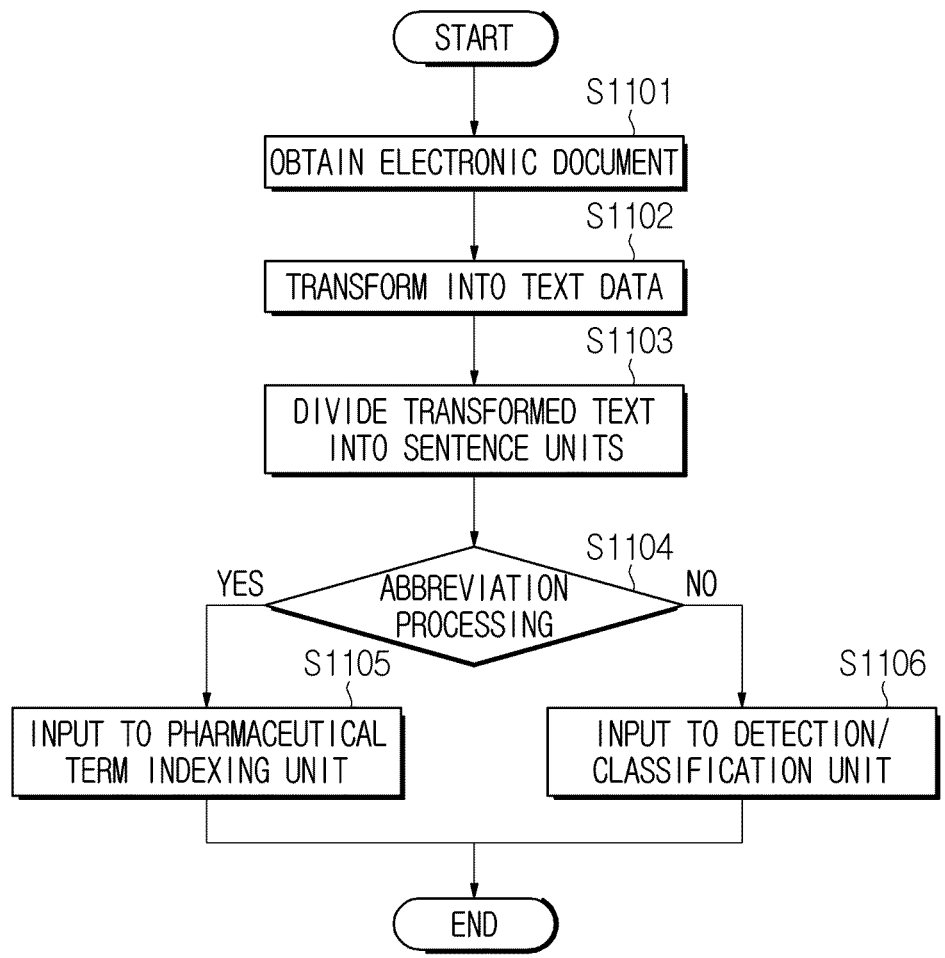
FIG. 11 illustrates a flowchart of a document preprocessing process according to an embodiment of the present disclosure.

FIG. 11 illustrates a flowchart of a document preprocessing process according to an embodiment of the present disclosure. FIG. 11 illustrates an operating method of an apparatus (e.g., the server 120, the apparatus 200, or the apparatus 300 for detecting safety information in the electronic document).

Referring to FIG. 11, in S1101, the apparatus may obtain an electronic document. Here, the electronic document may include documents such as PDF, web page, e-mail, scanned copy, image file, hwp, txt, docx, and doc. In particular, in the case of a PDF document, there may be various types of formats. Also, the electronic document according to the present disclosure may include a paper, a report, a medical certificate, and the like. The present disclosure may be applied to various types of electronic documents, and is not limited to the above examples. According to an embodiment of the present disclosure, the apparatus may obtain the electronic document through a wired or wireless communication method. For example, the apparatus may obtain the electronic document through file upload within the platform, e-mail, external hard drive, universal serial bus (USB), external/internal solid state drive (SSD), and the like.

In S1102, the apparatus may transform the electronic document into text data Specifically, the apparatus may transform text existing in the electronic document into text data. For example, if the obtained electronic document is a non-optical character reader (OCR)-processed document, the apparatus may OCR-process the document. Then, the transformed text data may be divided into sentence units. Here, the sentence is not required to have a grammatically complete form, and may have the form of a phrase or clause.

In S1103, the apparatus may divide the transformed text into sentence units. According to an embodiment of the present disclosure, when one sentence is disconnected due to column division, the sentence may be processed as one sentence.

In S1104, the apparatus may perform abbreviation transform processing. Specifically, if there is an abbreviation in the text data transformed in S1102, the apparatus may generate an abbreviation-full term data pair list by extracting the abbreviation and the full term. Since the full term used for the first time in the electronic document is described together with the abbreviation, the apparatus may generate an abbreviation-full term data pair list using this. Accordingly, after searching for the abbreviation in the transformed text data by utilizing the generated abbreviation-full term pair list, the abbreviation may be transformed into the full term. If the abbreviation transform process is performed, S1105 may be performed on the corresponding text. That is, pharmaceutical term indexing process may be performed on the text that has not been subjected to abbreviation transform. On the other hand, S1106 may be performed on text that has not been subjected to abbreviation transform. That is, the detection/classification process may be performed on text that has not been subjected to abbreviation transform.

Figure 12:
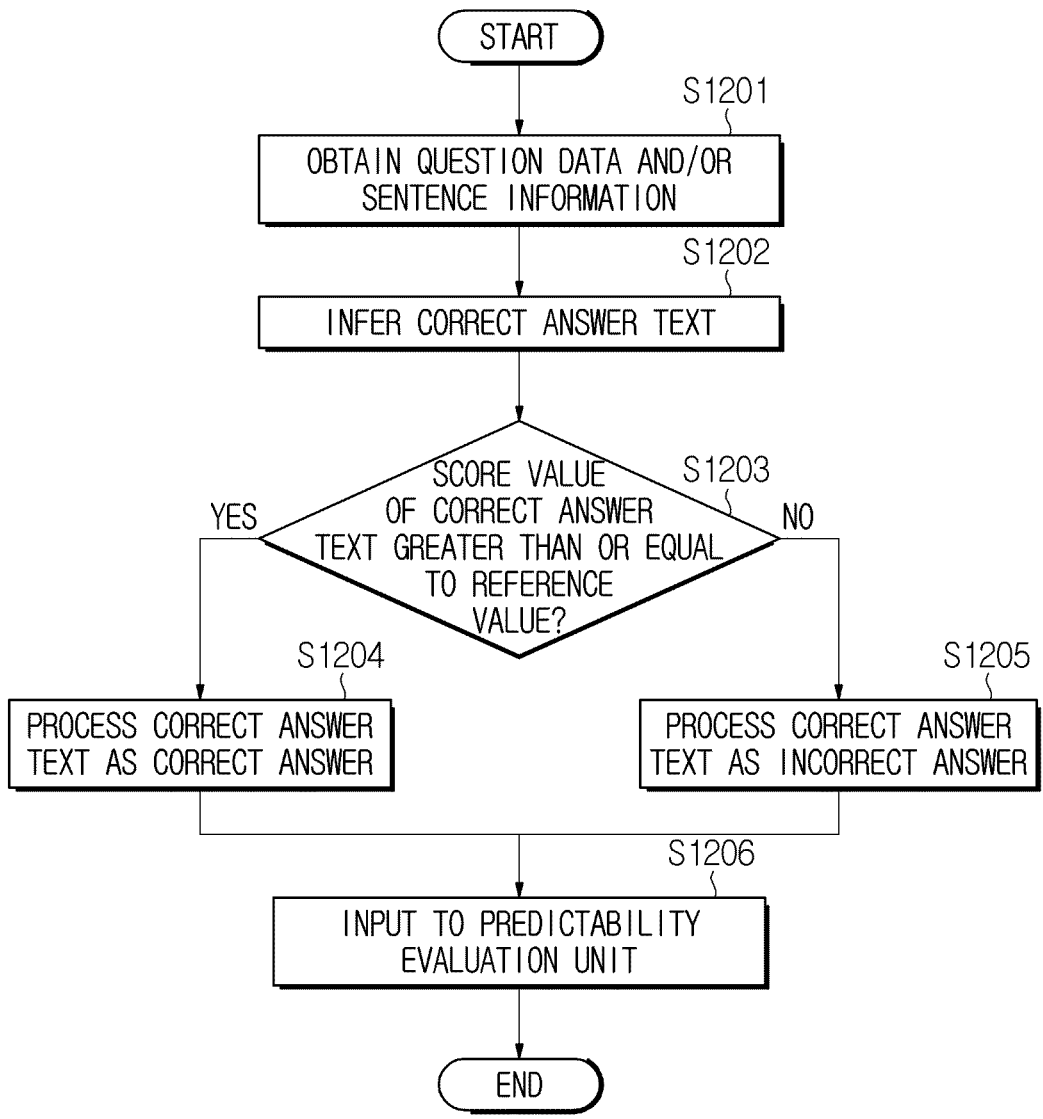
FIG. 12 is a flowchart of a method of driving a machine reading comprehension model according to an embodiment of the present disclosure.

FIG. 12 is a flowchart of a method of driving a machine reading comprehension model according to an embodiment of the present disclosure. FIG. 12 illustrates an operating method of an apparatus (e.g., the server 120, the apparatus 200, or the apparatus 300 for detecting safety information in the electronic document).

Referring to FIG. 12, in S1201, the apparatus may obtain question data and/or sentence information. Here, the question data may be generated using data extracted in the pharmaceutical term indexing step. In addition, the sentence information refers to sentences detected and classified in the detection/classification step or sentences near the sentence. Specifically, the question data may be generated by a question sentence predefined by a pharmaceutical expert or directly input by a user based on data extracted by the pharmaceutical term indexing unit.

In S1202, the apparatus may infer correct answer text. That is, when the apparatus inputs the obtained question data and/or sentence information to the machine reading comprehension model, the model may infer correct answer text. For example, if the question data obtained by the apparatus is 'what drug did the patient stop taking?', the apparatus may infer "Tylenol" as the correct answer text. Accordingly, the text determined by the machine reading comprehension model may be a pair of 'answer' and 'score'. Here, the score may be a value indicating how accurate an answer found by the AI for the question is. Specifically, the score may be a probability score for a correct answer of a machine reading comprehension (MRC) model output value. The MRC deep learning model may calculate scores for parts with high probability of correct answers in sentence information.

In S1203, the apparatus may determine whether the score value of the correct answer text is greater than or equal to a reference value. Here, the reference value may be a value set through data obtained by the user. If the score value of the correct answer text is equal to or greater than the reference value, S1204 may be performed. In S1204, the correct answer text may be processed as a correct answer. On the other hand, if the score value of the correct answer text is less than the reference value, S1205 may be performed. In S1205, the correct answer text is processed as incorrect answer. If there are multiple correct answer texts in which the score value of the correct answer text is greater than or equal to the reference value, the apparatus may process multiple correct answers. For example, if there are multiple correct answers found by the AI for a question, a score value for each correct answer may exist. In this case, if there are multiple score values equal to or greater than the reference value, the apparatus may process them as multiple correct answers. Finally, in S1206, the result of performing the above process may be input to the predictability evaluation unit 318. That is, relevant data information extracted through the machine reading comprehension model may be input to the predictability evaluation unit 318.

Exemplary methods of the present disclosure are presented as a series of operations for clarity of explanation, but this is not intended to limit the order in which steps are performed, and the steps may be performed concurrently or in different orders, if necessary. In order to implement the method according to the present disclosure, other steps may be included in addition to the exemplified steps, other steps may be included except for some steps, or additional other steps may be included except for some steps.

Various embodiments of the present disclosure are not intended to list all possible combinations, but are intended to explain representative aspects of the present disclosure, and matters described in various embodiments may be applied independently or in combination of two or more.

In addition, various embodiments of the present disclosure may be implemented by hardware, firmware, software, or a combination thereof. In the case of implementing the present disclosure by hardware, the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontrollers, microprocessors, etc.

The scope of the present disclosure includes software or machine-executable instructions (e.g., operating systems, applications, firmware, programs, etc.) that cause operations according to methods of various embodiments to be executed on a device or computer, and a non-transitory computer-readable medium in which such software or instructions and the like are stored and executable on a device or computer.

According to the present disclosure, adverse drug reaction (ADR) in electronic documents can be systematically managed.

According to the present disclosure, an ICSR (Individual Case Safety Report) can be detected and extracted from papers, literature, and the like.

According to the present disclosure, it is possible to more quickly process professional documents such as papers and literatures that are generally difficult to understand.

According to the present disclosure, a part with ICSR information in a long document can be immediately identified through original text highlighting.

According to the present disclosure, technical terms that are difficult to interpret can be processed more quickly.

According to the present disclosure, a vast amount of documents can be processed more quickly.

According to the present disclosure, ICSR information can be immediately checked even in a long document.

According to the present disclosure, a report can be prepared without checking original text by extracting the core information of an ICSR.

The features briefly summarized above with respect to the present disclosure are only exemplary aspects of the detailed description of the present disclosure that follows, and do not limit the scope of the present disclosure.

What is claimed is:

1. A method of detecting safety information in an electronic document, the method comprising:
    obtaining text data in the electronic document based on an optical character reader (OCR);
    dividing the text data into sentence units;
    extracting an abbreviation and a full term which are present in the text data divided into the sentence units;
    generating a data pair list based on the abbreviation and the full term;
    performing preprocessing for transforming the abbreviation into the full term based on the data pair list;
    filtering a duplicate case based on whether information for a previously reviewed document is included in a list of references existing in the text data;
    indexing pharmaceutical information on a preprocessed text;
    determining, based on a trained model, whether the electronic document is an individual case safety report (ICSR), wherein the trained model is trained with drug information and adverse event information;
    generating at least one report including at least one result among a first result of indexing the pharmaceutical information, a second result of comparing the pharmaceutical information and a list of terms, a third result of storing the pharmaceutical information or a fourth result of determining whether the electronic document is the ICSR; and
    outputting the at least one report in a viewable file format,
    wherein the indexing pharmaceutical information includes:
        comparing the pharmaceutical information and the list of terms; and
        storing at least one of a data name, a data size, a data property or a data recording location of the pharmaceutical information,
    wherein the at least one report comprises:
        at least one individual report including one of the first result, the second result, the third result, or the fourth result, or
        at least one of integrated reports including a result of integrating a plurality of results among the first result, the second result, the third result, and the fourth result,
        wherein the at least one report is generated further based on the duplicate case which is a filtered result, and
        wherein the list of terms includes a list of medical term names and codes.

2. The method of claim 1, wherein the performing preprocessing comprises transforming the electronic document into text data.

3. The method of claim 1, wherein the determining comprises:
    detecting whether the reference exists in text which is not transformed into the full term in the performing preprocessing; and
    checking whether another literature which has been previously reviewed exists in the detected reference.

4. The method of claim 1, wherein the indexing the pharmaceutical information comprises classifying text by inputting text which has not been subjected to abbreviation transform to a classification model.

5. The method of claim 4, wherein the classification model classifies input text by classification label.

6. The method of claim 4, wherein the classification model is a Bidirectional Encoder Representations from Transformers (BERT) fine-tuned using classification model learning data.

7. The method of claim 1, wherein the determining whether it is an ICSR comprises:
   performing reading comprehension and determination by inferring correct answer text using a result of indexing the pharmaceutical information;
   evaluating predictability by checking whether adverse event information of a drug exists in the result obtained in the performing reading comprehension and determination; and
   determining an individual adverse event by determining whether the electronic document corresponds to an ICSR,
   wherein whether the adverse event information of the drug exists is determined by whether the approval label for the drug exists in the electronic document.

8. The method of claim 7, wherein the performing reading comprehension and determination comprises inferring correct answer text by inputting, to a machine reading comprehension model, at least one of question data generated using data extracted in indexing of the pharmaceutical information or sentences generated in classifying by classification label.

9. The method of claim 8, wherein the machine reading comprehension model is a Bidirectional Encoder Representations from Transformers (BERT) fine-tuned using reading comprehension model learning data.

10. The method of claim 9, wherein the reading comprehension learning data comprises at least one of a paragraph, a question or an answer.

11. The method of claim 7, wherein the evaluating the predictability comprises:
   obtaining adverse drug reaction (ADR) information in the performing reading comprehension and determination;
   searching for the adverse event information in drug approval information; and
   checking whether the adverse event exists in the drug approval information,
   wherein, in the checking whether the adverse event exists in the drug approval information, it is determined to be a predictable side effect when the adverse rection exists in the drug approval information and it is determined to be an unpredictable side effect when the adverse rection does not exist in the drug approval information.

12. The method of claim 7, wherein the determining the individual adverse event comprises:
   inputting a result obtained in the evaluating the predictability to an ICSR determination system; and
   determining whether the obtained result corresponds to an ICSR.

13. The method of claim 1, further comprising highlighting original text.

14. The method of claim 13, wherein the highlighting the original text comprises finding and highlighting sentences classified by classification label in the classifying by classification label.

15. The method of claim 14, wherein the highlighting the original text comprises highlighting the original text with different colors by classification of the label detected in the classifying by classification label.

16. The method of claim 13, wherein the highlighting the original text comprises finding and highlighting terms indexed in the indexing the pharmaceutical information in the electronic document.

17. An apparatus for detecting safety information in an electronic document, the apparatus comprising:
   a storage unit configured to store information necessary for operation of the apparatus; and
   a processor connected to the storage unit,
   wherein the processor is configured to:
   obtain text data in the electronic document based on an optical character reader (OCR);
   divide the text data into sentence units;
   extract an abbreviation and a full term which are present in the text data divided into the sentence units;
   generate a data pair list based on the abbreviation and the full term;
   perform preprocessing for transforming the abbreviation into the full term based on the data pair list;
   filter a duplicate case based on whether information for a previously reviewed document is included in a list of references existing in the text data;
   index pharmaceutical information on a preprocessed text;
   determine, based on a trained model, whether the electronic document is an individual case safety report (ICSR), wherein the trained model is trained with drug information and adverse event information;
   generate at least one report including at least one result among a first result of the indexing the pharmaceutical information, a second result of comparing the pharmaceutical information and a list of terms, a third result of storing the pharmaceutical information or a fourth result of determining whether the electronic document is the ICSR; and
   output the at least one report in a viewable file format,
   wherein the processor is configured to index the pharmaceutical information includes:
      the processor is configured to compare the pharmaceutical information and the list of terms;
      the processor is configured to store at least one of a data name, a data size, a data property or a data recording location of the pharmaceutical information,
   wherein the at least one report comprises:
      at least one individual report including one of the first result, the second result, the third result, or the fourth result, or
      at least one of integrated reports including a result of integrating a plurality of results among the first result, the second result, the third result, and the fourth result,
   wherein the at least one report is generated further based on the duplicate case which is a filtered result, and
   wherein the list of terms includes a list of medical term names and codes.

18. The apparatus of claim 17, wherein the processor highlights a result output in a process of indexing the pharmaceutical information.

* * * * *